United States Patent [19]

Irifune et al.

[11] Patent Number: 5,100,990
[45] Date of Patent: Mar. 31, 1992

[54] ORGANOPOLYSILOXANE COMPOSITIONS AND CURED PRODUCTS THEREOF

[75] Inventors: Shinji Irifune; Kazuma Momii, both of Annaka; Masahiko Ogawa, Takasaki, all of Japan

[73] Assignee: Shin-Etsu Chemical Co., Ltd., Tokyo, Japan

[21] Appl. No.: 479,254

[22] Filed: Feb. 13, 1990

[30] Foreign Application Priority Data

Feb. 20, 1989 [JP] Japan .................. 1-41261[U]

[51] Int. Cl.$^5$ .............................................. C08G 77/06
[52] U.S. Cl. .................................... 528/15; 525/478
[58] Field of Search ......................... 528/15; 525/478

[56] References Cited

U.S. PATENT DOCUMENTS

| | | | |
|---|---|---|---|
| 2,781,331 | 2/1957 | Jones et al. | 260/63 |
| 3,350,362 | 10/1967 | Potts et al. | 260/77.5 |
| 3,607,536 | 9/1971 | Bragole | 156/331 |
| 3,867,360 | 2/1975 | Jones | 260/79.7 |
| 3,882,083 | 5/1975 | Berger et al. | 528/15 |
| 4,256,807 | 3/1981 | Jukes et al. | 428/379 |
| 4,340,710 | 7/1982 | Brown, Jr. | 528/15 |
| 4,472,563 | 9/1984 | Chandra et al. | 528/15 |
| 4,476,166 | 10/1984 | Eckberg | 528/15 |
| 4,530,989 | 7/1985 | Michel et al. | 528/15 |
| 4,562,096 | 12/1985 | Lo et al. | 427/208.8 |

FOREIGN PATENT DOCUMENTS

| | | |
|---|---|---|
| 44-31476 | 12/1969 | Japan . |
| 45-22018 | 7/1970 | Japan . |
| 47-6111 | 2/1972 | Japan . |
| 61-238851 | 10/1986 | Japan . |
| 8600083 | 9/1986 | PCT Int'l Appl. . |

Primary Examiner—Melvyn I. Marquis
Attorney, Agent, or Firm—Birch, Stewart, Kolasch & Birch

[57] ABSTRACT

An organopolysiloxane composition comprising (A) an organopolysiloxane having at least two aliphatic unsaturated radicals attached to different silicon atoms per molecule, (B) an organic silicon compound having at least two ≡SiH bond per molecule, and (C) a platinum catalyst is improved in curing behavior including pot life and curing time as well as release properties by adding thereto (D) an addition reaction controlling agent in the form of an isothiocyanate such as allyl, ethyl and phenyl isithiocyanates.

13 Claims, No Drawings

ORGANOPOLYSILOXANE COMPOSITIONS AND CURED PRODUCTS THEREOF

This invention relates to organopolysiloxane compositions having improved curing behavior and an extended pot life, providing a cured film of quality, and thus suited for use with release paper.

BACKGROUND OF THE INVENTION

In the prior art, organopolysiloxane compositions are widely used in a variety of applications because of their heat resistance, freeze resistance, and electrical insulation. Most of such organopolysiloxane compositions make use of the addition reaction between an organopolysiloxane having an alkenyl radical attached to a silicon atom and an organohydrogenpolysiloxane having a hydrogen atom attached to a silicon atom. Organopolysiloxane compositions of the addition reaction type are generally used for the purpose of rendering tack-free the surface of substrates like films, sheets, and non-woven fabrics of celluloses, synthetic resins, and synthetic fibers.

However, a heat treatment at 130° to 150° C. for about 30 to 60 seconds was generally necessary to convert an organopolysiloxane composition of the addition reaction type applied to the substrate into a cured coating having release properties. In order to impart release properties to less heat resistant substrates such as paper and synthetic resin films like polyethylene, polypropylene and polyvinyl chloride by forming a cured coating of organopolysiloxane thereon, it was essential to mitigate high temperature/long term heating conditions. There was a need for a silicone composition which can be readily cured into a coating at relatively low temperatures within a relatively short time. It was proposed to add relatively large amounts of platinum base catalyst to an organopolysiloxane composition of the addition reaction type in order to form a cured coating at relatively low temperatures within a relatively short time. However, this approach suffers from problems that it is uneconomical, the composition has poor shelf stability or a short pot life, and the resulting cured coatings show inconsistent release performance.

Attempts were made to solve the problems associated with large amounts of platinum base catalysts added to organopolysiloxane compositions of the addition reaction type, typically by using addition reaction controlling agents, for example, carbon tetrachloride (Japanese Patent Publication No. 6111/1972), acetylene alcohols (Japanese Patent Publication No. 31476/1969), acrylonitrile (Japanese Patent Publication No. 22018/1970), 1,3-dichloropropene (Japanese Patent Application Kokai No. 238851/1986), and maleates (U.S. Pat. Nos. 4,256,807, 4,530,989, and 4,562,096). However, the use of CCl$_4$ as the addition reaction controlling agent has a problem that no significant control of addition reaction could be accomplished unless CCl$_4$ is used in large amounts. Since the acetylene alcohols are reactive with hydrogen-silicon bonds, the hydrogen silicon bonds which are curing functional groups in the composition are consumed with time so that the composition loses its curing ability. In addition, since acetylene alcohols are volatile and have low flash points, they can be added only in limited amounts to organopolysiloxane compositions in the form of solventless coating liquid in view of safety. Since the acrylonitrile is weak in controlling the addition reaction, it must be added in large amounts in order to provide an effective control. Organopolysiloxane compositions containing large amounts of acrylonitrile suffer from a problem of short-curing and an environmental problem because the acrylonitrile gives off an offensive odor.

Other addition reaction controlling agents were proposed, for example, diallyl maleates, maleimides, and hydrocarboxymaleates. However, all these compounds are less soluble in organopolysiloxanes, and thus added only in limited amounts in order that the organopolysiloxane compositions can uniformly cure into a thin coating. They are thus still unsatisfactory.

SUMMARY OF THE INVENTION

Therefore, an object of the invention is to provide an organopolysiloxane composition having an improved ability to cure at relatively low temperatures within a relatively short time, having improved shelf stability and an extended pot life, and forming a uniform cured coating having stable release properties with time. Another object of the invention is to provide a cured product thereof.

Making extensive investigations on reaction controlling agents to be added to organopolysiloxane compositions of the addition reaction type, we have found that for an organopolysiloxane composition comprising (A) an organopolysiloxane having at least two aliphatic unsaturated radicals attached to different silicon atoms per molecule, (B) an organic silicon compound having at least two hydrogen atoms attached to different silicon atoms (or at least two ≡SiH bonds) per molecule, and (C) platinum or a platinum compound, an isothiocyanate derivative having the formula:

$$R-N=C=S \qquad (I)$$

wherein R is a substituted or unsubstituted monovalent hydrocarbon radical having 1 to 10 carbon atoms is an effective reaction controlling agent even in minor amounts. More particularly, the isothiocyanate derivative is fully effective in controlling the addition reaction when it is added in amounts of 0.00001 to 1 part by weight, especially 0.00005 to 0.05 parts by weight per 100 parts by weight of component (A). It is inert to components (A) and (B). It does not cause rapid self condensation of ≡SiH bonds to occur when it is mixed with components (B) and (C). There is thus obtained an organopolysiloxane composition which has such curing behavior that it can be readily cured at relatively low temperatures within a relatively short time, has an extended pot life, and produces a cured coating of uniform quality having minimized time variability of stripping and mold release properties.

Therefore, the present invention provides an organo polysiloxane composition comprising (A) an organopolysiloxane having at least two aliphatic unsaturated radicals attached to different silicon atoms per molecule, (B) an organic silicon compound having at least two hydrogen atoms attached to different silicon atoms (or at least two ≡SiH bonds) per molecule, (C) platinum or a platinum compound, and (D) an isothiocyanate derivative having the formula:

$$R-N=C=S \qquad (I)$$

wherein R is a substituted or unsubstituted monovalent hydrocarbon radical having 1 to 10 carbon atoms.

The invention also provides a cured product which is obtained by curing the organopolysiloxane composition.

DETAILED DESCRIPTION OF THE INVENTION

Component (A) of the organopolysiloxane composition of the invention is an organopolysiloxane having at least two aliphatic unsaturated radicals attached to different silicon atoms per molecule, typically an organopolysiloxane having the following structure in its molecule.

$$R^1_a R^2_b SiO_{(4-a-b)/2} \quad \text{(III)}$$

In formula (II), substituent $R^1$ is an unsaturated hydrocarbon radical such as vinyl, allyl,

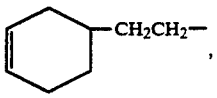

and $CH_2=CHCOOR^3$ wherein $R^3$ is a divalent organic radical such as an alkylene radical having 1 to 5 carbon atoms. Substituent $R^2$ is a substituted or unsubstituted monovalent hydrocarbon radical having 1 to 8 carbon atoms, for example, an alkyl radical such as methyl, ethyl, propyl and butyl, an aryl radical such as phenyl and tolyl, a cycloalkyl radical such as cyclohexyl, or substituted ones of these radicals in which some or all of the hydrogen atoms attached to carbon atoms are replaced by halogen atoms or the like, such as chloromethyl and 3,3,3-trifluoropropyl. Preferably $R^2$ is independently selected from such substituted or unsubstituted monovalent saturated hydrocarbon radicals having 1 to 8 carbon atoms. More preferably, $R^2$ is selected such that methyl radicals occupy at least 70% of the entire organic radicals of the organo-polysiloxane per molecule. Letters a and b are in the range: $1 \leq a \leq 3$, $0 \leq b \leq 3$, and $1 \leq a+b \leq 3$.

The organopolysiloxane may be of straight or branched chain and have an unsaturated radical at the end or an intermediate of its molecular chain. Preferably it is a straight one blocked with a vinylsilyl radical at each end of its molecular chain. The vinylsilyl radical at the molecular end may contain one or more vinyl radicals.

Component (A) may be a copolymer of an organopolysiloxane formula (II) and a modified form of organo. polysiloxane of formula (II) having a ≡Si—Si≡ or ≡Si—R⁴—Si≡ bond incorporated therein wherein R4 is a divalent organic radical such as an alkylene radical having 1 to 5 carbon atoms.

Component (B), which is a crosslinking agent for component (A), is an organic silicon compound having at least two hydrogen atoms attached to different silicon atoms, that is, at least two ≡SiH bonds per molecule The organic silicon compound may be either a low molecular weight silane compound or a siloxane having a ≡Si—O—Si≡ bond. It may also be a compound having ≡Si—Si≡ bond. Its structure may be linear, cyclic, branched, or graft.

The viscosity of the organic silicon compound is not particularly limited although it preferably has a viscosity of 5 to 1,000 centipoise at 25° C. for sufficient compatibility with component (A) to promote addition reaction of the composition.

Component (B) is preferably blended such that the molar ratio of the ≡SiH bond in component (B) to the unsaturated bond in component (A) is in the range of from 0.5 to 200, especially from 1 to 5. Generally, 0.1 to 20 parts by weight of component (B) is used per 100 parts by weight of component (A) or organopolysiloxane.

Component (C) is platinum or a platinum compound. The platinum catalyst may be selected from those well known as addition reaction catalysts, for example, platinum black or platinum on silica, carbon black or other carriers, chloroplatinic acid, chloroplatinic acid in alcohol, and complex salts of chloroplatinic acid with olefins or vinylsiloxanes.

Platinum or a platinum compound may be used in a catalytic amount, generally in an amount of 0.0001 to 0.1 part by weight of metallic platinum per 100 parts by weight of component (A).

Component (D), a novel agent for controlling reaction of an organopolysiloxane composition comprising components (A), (B), and (C) at room temperature, is an isothiocyanate derivative having the formula:

$$R-N=C=S \quad \text{(I)}$$

wherein R is a substituted or unsubstituted monovalent hydrocarbon radical having 1 to 10 carbon atoms. This isothiocyanate derivative is inert to components (A) and (B) and does not form an irreversible coordination compound with component (C). Therefore, by adding the isothiocyanate derivative as a reaction controlling agent, a composition comprising components (A), (B), and (C) is extended in pot life or shelf stability and improved in curing behavior.

In formula (I), R is a substituted or unsubstituted monovalent hydrocarbon radical having 1 to 10 carbon atoms, for example, an alkyl radical such as methyl, ethyl, propyl, and butyl, an aryl radical such as phenyl and tolyl, an allyl radical, a cycloalkyl radical such as cyclohexyl, or substituted ones of these radicals in which some or all of the hydrogen atoms attached to carbon atoms are replaced by halogen atoms or the like, such as chloromethyl and 3,3,3-trifluoropropyl. Among these, ethyl, allyl and phenyl radicals are preferred.

The isothiocyanate derivative of formula (I) may preferably be added in an amount of 0.00001 to 1 part by weight, more preferably 0.00005 to 0.05 parts by weight per 100 parts by weight of component (A). Less than 0.00001 part by weight of the isothiocyanate derivative would be too small to be effective whereas more than 1 part by weight of the isothiocyanate derivative would sometimes detract from the curing behavior of the composition.

In addition to components (A) through (D), the composition of the invention may contain any desired additives insofar as the objects of the invention are accomplished. The useful additives include reaction controlling agents other than the isothiocyanate derivative of formula (I), for example, 3-methyl-1-butyn-3-ol and silylated compounds thereof and acetylene alcohol derivatives such as ethynylcyclohexyl alcohol; organic polymers such as non-reactive siloxane and isobutylene oligomers; cellulose derivatives for imparting writability to a silicone coating resulting from the composition; fillers such as silica, titanium white, and red oxide; coloring agents such as dyes and pigments; and film modifiers such as low molecular weight hydroxyl end-blocked siloxanes. These additives may be added in ordinary amounts commonly used for their purposes.

The composition of the invention may be prepared by mixing the above-mentioned essential and optional components in a conventional manner. For example, component (D) may be added to a mixture of components (A) and (B) or a mixture of components (A), (B), and (C), followed by aging. Alternatively, a mixture of components (C) and (D) may be added to a mixture of components (A) and (B). As opposed to the prior art reaction controlling agents which, when previously mixed with components (B) and (C), tend to invite rapid self condensation of ≡SiH or convert the catalyst into an inorganic inactive form, the isothiocyanate derivative according to the present invention gives rise to no problem when mixed with components (B) and (C) as the reaction controlling agent.

The composition of the invention may be of the solvent Q type wherein an organic solvent such as toluene is added in mixing the components as above. A solventless composition is also contemplated.

When it is maintained at a requisite temperature for a requisite time after mixing of the components, the composition becomes a gel, elastomer or solid depending on the type and proportion of the components. The composition of the invention may be cured at room temperature, but its curing can be promoted by heating to a temperature of 50 to 150° C. or higher.

Because of an extended pot life and excellent curing behavior, the organopolysiloxane composition of the invention will find a variety of uses as mold release agents, potting agents, templating agents, electrical insulating molding materials and the like. The composition of the invention may be used as a surface treating agent for various substrates such as paper, plastic films, plates, and metal foil, by applying the composition to the substrate by roll coating, gravure coating or spraying, followed by heating to a temperature of at least 65° C., preferably at least 70° C. The coated substrate may be exposed to ultraviolet radiation for crosslinking and curing. The composition of the invention is injection moldable when it contains an inorganic filler. Molded articles can be obtained by means of a liquid injection molding machine within a short time by heating the mold to 120° to 150° C. The composition of the invention also enables insulative embedment or encapsulation of various electric or electronic parts because it can be cured by heating to about 100° C.

The organopolysiloxane composition of the present invention has an extended pot life and is able to cure at relatively low temperatures within a relatively short time into a uniform film having minimized time variability of stripping and mold release properties. The organopolysiloxane composition of the invention thus finds a variety of uses as mold release agents, potting agents, templating agents, electrical insulating molding materials and the like. Since the composition may be solventless, it is readily applicable to films and substrates sensitive to solvents.

EXAMPLE

Examples of the present invention are given below by way of illustration and not by way of limitation. All parts and percents are by weight unless otherwise stated. Viscosity is measured in centipoise (cp) at 25° C. The test methods used in the examples are explained first.

Pot life

A sample composition (250 grams) was allowed to stand in a 500-ml glass beaker at 25° C. or 40° C. with gentle stirring. The sample was measured at intervals for viscosity, curing state, and stripping properties. The pot life (in day) was determined from these factors.

Curing time

A predetermined amount of a sample composition was coated to a polyethylene laminated sheet of paper and placed in a hot air circulating dryer at 120° C. or 160° C. The curing time (in second) was measured until the coating was completely cured. Curing was judged complete at the time when the coating was not stripped away or clouded at the surface by rubbing with fingers.

Stripping force

A predetermined amount of a sample composition was coated to a polyethylene laminated sheet of paper. The coating was cured by heating in a hot air circulating dryer at a predetermined temperature for a predetermined time. Then to the surface of the cured coating was applied each of solvent type acrylic adhesives, Oribine BPS-8170 and BPS. 5127 (Toyo Ink K.K.) and an emulsion type acrylic adhesive, Orybin BPW-3110H (Toyo Ink K.K.). The adhesive applied coatings were heat treated at 100° C. for 3 minutes.

A mating sheet of paper having a weight of 64 gram/m$^2$ was attached to the coated sheet through the adhesive. The assembly was aged at 25° C. for 20 hours and cut into a strip of 5 cm wide. Using a peeling test machine, the mating sheet was pulled at an angle of 180° and a rate of 300 mm/min. The force (in gram) required to strip the mating sheet from the coated sheet was measured.

Residual bond

As in the measurement of stripping force, a coating of a sample composition was cured to a polyethylene laminated sheet of paper. A length of polyester tape, Nitto polyester tape 31B (Nitto Denki Kogyo K.K.) was placed on the coated sheet. The assembly was then heat treated at 70° C. for 20 hours under a load of 20 g/cm$^2$. The polyester tape was removed and attached to a stainless steel plate. The polyester tape was stripped from the stainless steel plate by pulling at an angle of 180° and a rate of 300 mm/min. to measure the force (in gram) required to strip the tape from the plate. Similarly, the force (in gram) required to strip a non-treated standard polyester tape from the stainless steel plate was measured. The residual bond is a percentage of the former relative to the latter.

EXAMPLES 1–7

An organopolysiloxane composition of Example 1 was prepared by blending 100 parts of a dimethylpolysiloxane blocked with a dimethylvinylsilyl radical at each end of its molecular chain and having a viscosity of 400 cp and 3 parts of a methylhydrogenpolysiloxane of the formula:

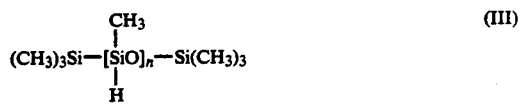

(III)

blocked with a trimethyl radical at each end of its molecular chain and having a viscosity of 20 cp, and adding 0.01 part (1.03 × 10$^{-4}$ mol) of allyl isothiocyanate of the formula:

(I—i)

to 103 parts of the blend. A platinum vinylsiloxane complex was added to the composition so as to provide 0.01 part of platinum.

Compositions of Examples 2 and 3 were prepared by the same procedure as Example 1 except that ethyl isothiocyanate of the formula:

$$CH_3CH_2-N=C=S \qquad (I-ii)$$

and phenyl isothiocyanate of the formula:

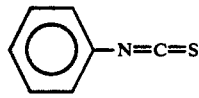
(I-iii)

were respectively used in equimolar amounts instead of the allyl isothiocyanate.

A composition of Example 4 was prepared by the same procedure as Example 1 except that a mixture of 0.0051 parts ($5 \times 10^{-5}$ mol) of ethyl isothiocyanate of the formula (I—ii) and 0.8 parts ($5 \times 10^{-3}$ mol) of silylated 3-methyl-1-butyn-3-ol of the formula:

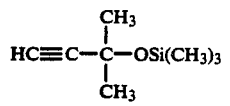
(IV)

was used instead of the allyl isothiocyanate.

For comparison purposes, a composition of Example 5 was prepared by the same procedure as Example 1 except that 0.016 parts ($1.03 \times 10^{-4}$ mol) of silylated 30-methyl 1-butyn-3-ol of formula (IV) was used instead of the cyanate.

A composition of Example 6 was prepared by the same procedure as Example 5 except that the amount of silylated 3-methyl-1-butyn-3-ol used was changed to 0.8 parts ($5 \times 10^{-3}$ mol).

A composition of Example 7 was prepared by the same procedure as Example 1 except that 0.0145 parts ($0.515 \times 10^{-4}$ mol) of thiomichler's ketone of the formula:

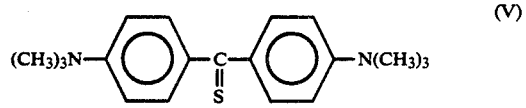
(V)

was used instead of the allyl isothiocyanate.

The organopolysiloxane compositions of Examples 1 through 7 were determined for pot life at 40° C. Each of the compositions was applied to a polyethylene laminated sheet of paper by means of wire-wound doctor #0 to a coating weight of 1.0 gram/m². After 1 hour and 24 hours from catalyst addition, the doctor coated samples were determined for curing time at 160° C. and all heat cured at 160° C. for 30 seconds before the cured coatings were examined for stripping force and residual bond.

The results are shown in Table 1.

TABLE 1

| Example | Curing time (sec) | Viscosity (cp) | Stripping force (g/5 cm) | | Residual Bond (%) | Pot life @ 40° C. (day) |
|---|---|---|---|---|---|---|
| | | | BPS-3110H | BPS-5127 | | |
| Coating after 1 hour from catalyst addition | | | | | | |
| 1 | 30 | 370 | 32 | 175 | 96 | |
| 2 | 30 | 370 | 28 | 135 | 96 | |
| 3 | 30 | 370 | 22 | 125 | 100 | |
| 4 | 30 | 375 | 27 | 86 | 100 | |
| 5* | 10 | 390 | 38 | 81 | 98 | |
| 6* | 15 | 375 | 26 | 85 | 100 | |
| 7* | 30 | 380 | 13 | 177 | 49 | |
| Coating after 24 hours from catalyst addition | | | | | | |
| 1 | 30 | 425 | 23 | 189 | 99 | ≧7 |
| 2 | 30 | 450 | 22 | 119 | 99 | ≧7 |
| 3 | 30 | 480 | 22 | 99 | 95 | ≧6 |
| 4 | 30 | 480 | 24 | 117 | 96 | 5 |
| 5* | — | gelled | — | — | — | — |
| 6* | — | gelled | — | — | — | — |
| 7* | 30 | 460 | 18 | 117 | 93 | 2 |

*outside the scope of the invention

As is evident from Table 1, the organopolysiloxane compositions of Examples 1 to 3 have a substantially longer pot life at 40° C., more long-lasting curing ability, and more long-lasting stripping force and residual bond than the compositions of (Comparative) Examples 5 to 7. The composition of Example 4 which is obtained by adding ethyl isothiocyanate to the composition of Example 6 shows that the use of an isothiocyanate derivative in combination with an acetyl alcohol derivative can extend the pot life of an organopolysiloxane composition while maintaining the curing ability equal to that available with the only use of an acetyl alcohol derivative.

EXAMPLES 8.12

An organopolysiloxane composition of Example 8 was prepared by blending 30 parts of an organopolysiloxane blocked with a vinyldimethylsilyl radical at each end of its molecular chain, containing 1.5 mol% of the entire organic radicals of vinyl and the balance of methyl, and having a viscosity of 5,000 cp as measured in a 30% by weight toluene solution at 25° C. with 0.47 parts of a methylhydrogenpolysiloxane of the formula:

$$(R^1SiO_{1.5})_m(R^2_2HSiO_{0.5})_n \qquad (VI)$$

wherein $R^1$ and $R^2$ are methyl radicals, and letters m and n are numbers meeting the relationship $0.1 < n/m < 3$, having a viscosity of 8.2 cp and a hydrogen gas emission of 170 ml/g (see Japanese Patent Application Kokai No. 235461/1986) and 0.23 parts of a methylhydrogenpolysiloxane of formula (III) having a viscosity of 20 cp, and adding 0.005 parts (5 × $10^{-5}$ mol) of allyl isothiocyanate of formula (I-i) to the blend. The composition was diluted with toluene to a concentration of 5%. A platinum vinylsiloxane complex was added to the composition so as to provide 0.005 part of platinum. The composition was completed by thorough stirring.

A composition of Example 9 was prepared by the same procedure as Example 8 except that the amount of allyl isothiocyanate was changed to 0.0025 parts (2.5 × $10^{-5}$ mol).

A composition of Example 10 was prepared by further adding 1.0 parts (6.2 × $10^{-3}$ mol) of silylated 3-methyl-1-butyn-3-ol of formula (IV) to the composition of Example 9.

For comparison purposes, a composition of Example 11 was prepared by the same procedure as Example 8 except that 1.0 parts (6.2 × $10^{-3}$ mol) of silylated 3-methyl-1-butyn-3-ol of formula (IV) was used instead of the allyl isothiocyanate.

A composition of Example 12 was prepared by the same procedure as Example 8 except that 0.029 parts (5.1 × $10^{-5}$ mol) of thiomichler's ketone of the formula (V) was used instead of the allyl isothiocyanate.

The organopolysiloxane compositions of Examples 8 through 12 were determined for pot life at 25° C. until they gelled. Each of the compositions was applied to a polyethylene laminated sheet of paper by means of wire-wound doctor #14 to a coating weight of about 0.8 gram/m². After 1 hour and 24 hours from catalyst addition, the doctor coated samples were determined for curing time at 120° C. and the cured coatings were examined for stripping force and residual bond.

The results are shown in Table 2.

TABLE 2

| Example | Curing time (sec) | Viscosity (cp) | Stripping force (g/5 cm) BPS-8170 | Stripping force (g/5 cm) BPS-5127 | Residual Bond (%) | Pot life @ 25° C. (day) |
|---|---|---|---|---|---|---|
| Coating after 1 hour from catalyst addition ||||||||
| 8 | 20 | 18.0 | 44 | 51 | 103 | |
| 9 | 15 | 17.5 | 51 | 67 | 105 | |
| 10 | 20 | 15.5 | 54 | 64 | 102 | |
| 11* | 12 | 17.5 | 41 | 96 | 102 | |
| 12* | 20 | 15.0 | 36 | 82 | 102 | |
| Coating after 24 hours from catalyst addition ||||||||
| 8 | 20 | 19.5 | 33 | 43 | 113 | 6 |
| 9 | 20 | 19.5 | 43 | 53 | 109 | 4 |
| 10 | 20 | 20.5 | 35 | 46 | 110 | 6 |
| 11* | ** | 20.5 | 26 | 45 | 105 | 2 |
| 12* | 30 | 20 | 26 | 45 | 109 | 3 |

*outside the scope of the invention
**stripped even after 60 seconds

As is evident from Table 2, the organopolysiloxane compositions of Examples 8 to 10 maintain more stable curing ability with the lapse of time and have a longer pot life than the compositions of (Comparative) Examples 11 and 12. It is seen that the compositions of the invention possess stable curing ability even when they ar of solvent type.

EXAMPLE 13-14

An organopolysiloxane composition of Example 13 was prepared by blending 100 parts of a dimethylpolysiloxane end-capped with vinyldimethylsilyl and trimethylsilyl radicals in an average molar ratio of 1.1 and having a viscosity of 800 cp and 0.73 parts of a methylhydrogenpolysiloxane of formula (III) blocked with a trimethyl radical at each end of its molecular chain and having a viscosity of 100 cp, and adding 0.001 parts (1.0× $10^{-5}$ mol) of allyl isothiocyanate of formula (I-i) to 100.73 parts of the blend. A platinum vinylsiloxane complex was added to the composition so as to provide 0.0005 part of platinum.

For comparison purposes, a composition of Example 14 was prepared by the same procedure as Example 13 except that 0.062 parts (5.0 × $10^{-4}$ mol) of ethynylcyclohexyl alcohol of the formula:

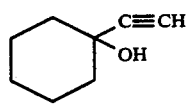

(VII)

was used instead of the allyl isothiocyanate.

The organopolysiloxane composition of Examples 13 and 14 were determined for pot life at 60° C. The compositions were cured by heating at 150° C. for 120 hours. Penetration was measured by means of a penetrometer using a ¼ scale conical penetrator.

The results are shown in Table 3.

TABLE 3

| Example | Penetration | Pot life @ 60°C. |
|---|---|---|
| 13 | 65 | ≧30 days |
| 14 | 64 | 10 days |

Table 3 also shows that the composition of the invention has a long pot life.

Although some preferred embodiments have been described, many modifications and variations may be made thereto in the light of the above teachings. It is therefore to be understood that within the scope of the appended claims, the invention may be practiced otherwise than as specifically described.

We claim:
1. An organopolysilixane composition comprising:
   (A) 100 parts by weight of an organopolysiloxane having at least two aliphatic unsaturated radicals attached to different silicon atoms per molecule,
   (B) 0.1 to 20 parts by weight of an organic silicon compound having at least two hydrogen atoms attached to different silicon atoms per molecule,
   (C) a catalytic amount of platinum or a platinum compound, and

(D) 0.00001 to 1 part by weight of an isothiocyanate derivative having the formula:

$$R\!-\!N\!=\!C\!=\!S \qquad (I)$$

wherein R is a substituted or unsubstituted monovalent hydrocarbon radical having 1 to 10 carbon atoms.

2. The composition of claim 1 wherein component (A) is an organopolysiloxane having the formula:

$$R^1_a R^2_b SiO_{(4-a-b)/2} \qquad (II)$$

wherein $R^1$ is an unsaturated hydrocarbon radical having 2 to 10 carbon atoms, $R^2$ is a substituted or unsubstituted monovalent hydrocarbon radical having 1 to 8 carbon atoms, and letters a and b are in the range: $1 \leq a \leq 3$, $0 \leq b \leq 3$, and $1 \leq a+b \leq 3$.

3. The composition of claim 2 wherein in formula (II), $R^1$ is independently selected form the group consisting of vinyl, allyl,

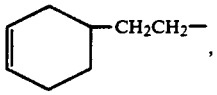

and $CH_2\!=\!CHCOOR^3$ wherein $R^3$ is a divalent organic radical having 1 to 5 carbon atoms, and $R^2$ has 1 to 8 carbon atoms and is independently selected from the group consisting of an alkyl radical, an aryl radical, a cycloalkyl radical, and substituted one of these radicals in which some or all of the hydrogen atoms attached to carbon atoms are replaced by halogen atoms.

4. The composition of claim 1 wherein in formula (I), R has 1 to 10 carbon atoms and is selected from the group consisting of an alkyl radical, an aryl radical, an allyl radical, a cycloalkyl radical, and substituted one of these radicals in which some or all of the hydrogen atoms attached to carbon atoms are replaced by halogen atoms.

5. The composition of claim 4 wherein R is allyl.

6. The composition of claim 4 wherein R is ethyl.

7. The composition of claim 4 wherein R is phenyl.

8. The composition of claim 2 wherein in formula (I), R has 1 to 10 carbon atoms and is selected from the group consisting of an alkyl radical, an aryl radical, an allyl radical, a cycloalkyl radical, and a substituted one of these radicals in which some or all of the hydrogen atoms attached to carbon atoms are replaced by halogen atoms.

9. The composition of claim 3 wherein in formula (I), R has 1 to 10 carbon atoms and is selected from the group consisting of an alkyl radical, an aryl radical, an allyl radical, a cycloalkyl radical, and a substituted one of these radicals in which some or all of the hydrogen atoms attached to carbon atoms are replaced by halogen atoms.

10. The composition of claim 1 wherein component (D) is present in an amount of 0.00005 to 0.05 parts by weight.

11. The composition of claim 1 wherein the organic silicon compound of component (B) has a viscosity of 5 to 1000 centipoise at 25° C.

12. The composition of claim 1 wherein component (B) is present in an amount such that the molar ratio of the $\equiv$SiH bond in component (B) to the saturated bond in component (A) is in the range of from 0.5 to 200.

13. The composition of claim 1 wherein component (B) is present in an amount such that the molar ratio of the $\equiv$SiH bond in component (B) to the saturated bond in component (A) is in the range of from 1 to 5.

* * * * *